(12) United States Patent
Stewart et al.

(10) Patent No.: US 12,339,132 B2
(45) Date of Patent: Jun. 24, 2025

(54) AUTONOMOUS VEHICLE PLAYLISTS

(71) Applicant: Autonomous Solutions, Inc., Mendon, UT (US)

(72) Inventors: Brian Stewart, Mendon, UT (US); Paul Lewis, Mendon, UT (US); Ben Hill, Mendon, UT (US); Dave Hollingshead, Mendon, UT (US); Sean Gardner, Mendon, UT (US); Eric Budd, Mendon, UT (US)

(73) Assignee: Autonomous Solutions, Inc., Mendon, UT (US)

( * ) Notice: Subject to any disclaimer, the term of this patent is extended or adjusted under 35 U.S.C. 154(b) by 161 days.

(21) Appl. No.: 17/974,501

(22) Filed: Oct. 26, 2022

(65) Prior Publication Data

US 2023/0138931 A1 May 4, 2023

Related U.S. Application Data

(60) Provisional application No. 63/273,861, filed on Oct. 29, 2021.

(51) Int. Cl.
*G01C 21/00* (2006.01)
*B60W 60/00* (2020.01)
*G01C 21/34* (2006.01)
*G01C 21/36* (2006.01)
*G06F 3/0482* (2013.01)

(52) U.S. Cl.
CPC ....... *G01C 21/3611* (2013.01); *B60W 60/001* (2020.02); *G01C 21/3407* (2013.01); *G06F 3/0482* (2013.01)

(58) Field of Classification Search
CPC .......... G01C 21/3611; G01C 21/3407; B60W 60/001; B60W 60/0011; G06F 3/0482; G06F 3/04842
See application file for complete search history.

(56) References Cited

U.S. PATENT DOCUMENTS

| 2003/0014286 | A1 | 1/2003 | Cappellini |
| 2006/0167621 | A1 | 7/2006 | Dale |
| 2013/0219318 | A1 | 8/2013 | Schreiber et al. |
| 2013/0304377 | A1* | 11/2013 | Van Hende ............ G01C 21/20 701/533 |
| 2014/0081568 | A1* | 3/2014 | Pieper .................. G05D 1/0219 701/400 |
| 2015/0345967 | A1 | 12/2015 | Meuleau |

(Continued)

OTHER PUBLICATIONS

International Search Report and Written Opinion as issued in connection with International Patent Application No. PCT/US2022/047945, mailed Jul. 3, 2023, 11 pages.

*Primary Examiner* — Anne Marie Antonucci
*Assistant Examiner* — Jordan T Smith

(57) ABSTRACT

An autonomous vehicle system that provides a playlist of potential paths for a user to select and implement so that an autonomous vehicle can follow the playlist of potential paths from one path to another path to another path is disclosed. The playlist may include one or more paths repeated any number of times. In addition, one cycle of a playlist may be repeated one or more times. The paths may be created, for example, by a user in an autonomous vehicle command and control system. The playlist of potential paths, once created, may be communicated to an autonomous vehicle for execution.

3 Claims, 5 Drawing Sheets

(56) References Cited

U.S. PATENT DOCUMENTS

| | | |
|---|---|---|
| 2017/0160742 A1 | 6/2017 | Ross et al. |
| 2017/0300064 A1* | 10/2017 | Wolters ................ A01B 69/008 |
| 2020/0064144 A1* | 2/2020 | Tomita .................... B62D 6/00 |
| 2020/0370900 A1* | 11/2020 | Pryakhin .......... G08G 1/096844 |
| 2024/0219925 A1* | 7/2024 | Barboi ................. G05D 1/0016 |

* cited by examiner

AUTONOMOUS VEHICLE PLAYLISTS

BACKGROUND

Vehicles, including autonomous vehicle, are often required to undergo extensive and repeated safety and durability tests. Often these tests occur in a controlled environment with various other vehicles, obstacles, conditions, events, etc. And in some cases, these tests are not repeatable.

SUMMARY

A method is disclosed for creating playlists of paths for an autonomous vehicle. The method may include providing a listing of paths to a user through a user interface; receiving a selection of a first path from a user through the user interface; receiving a selection of a second path from the user through the user interface; and creating a consolidated path that includes the first path and the second path.

The method may also include creating a consolidated path includes creating a waypoint between the first path and the second path. The method may also include receiving a waypoint between the first path and the second path; and wherein creating the consolidated path includes the waypoint.

The method may also include receiving a first repeat number from the user through the user interface; and creating the consolidated path includes repeating the first path within the consolidated path the first repeat number of times.

The method may also include receiving a second repeat number from the user through the user interface; and creating the consolidated path includes repeating the second path within the consolidated path the second repeat number of times.

The method may also include receiving a playlist number from the user through the user interface; and creating the consolidated path includes repeating the consolidated path the playlist number of times.

The method may also include transmitting the consolidated path to an autonomous vehicle.

An autonomous vehicle command and control system is also disclosed. The autonomous vehicle command and control system may include a user interface; a digital storage; a communication interface; and a controller communicatively coupled with the user interface, the communication interface, and the digital storage. The controller may provide a listing of paths stored in the digital storage to a user through the user interface; receive a selection of a first path from a user through the user interface; receive a selection of a second path from the user through the user interface; and create a consolidated path that includes the first path and the second path.

The controller may also create a waypoint between the first path and the second path.

The controller may also receive a waypoint between the first path and the second path; and wherein creating the consolidated path includes the waypoint.

The controller may also receive a first repeat number from the user through the user interface; and the controller repeats the first path within the consolidated path the first repeat number of times.

The controller may also receive a second repeat number from the user through the user interface; and the controller repeats the second path within the consolidated path the second repeat number of times.

The controller may also receive a playlist number from the user through the user interface; and the controller repeats the consolidated path the playlist number of times.

The controller may also transmit the consolidated path to an autonomous vehicle via the communication interface.

A non-transitory computer-readable medium is also disclosed that stores instructions that, when executed by a computing device, cause the computing device to provide a listing of paths to a user through a user interface; receive a selection of a first path from a user through the user interface; receive a selection of a second path from the user through the user interface; and create a consolidated path that includes the first path and the second path.

The non-transitory computer-readable medium may include instructions to cause the computing device to create a consolidated path includes creating a waypoint between the first path and the second path.

The non-transitory computer-readable medium may include instructions to cause the computing device to receive a waypoint between the first path and the second path; and wherein creating the consolidated path includes the waypoint.

The non-transitory computer-readable medium may include instructions to cause the computing device to receive a first repeat number from the user through the user interface; and wherein creating the consolidated path includes repeating the first path within the consolidated path the first repeat number of times.

The non-transitory computer-readable medium may include instructions to cause the computing device to receive a second repeat number from the user through the user interface; and wherein creating the consolidated path includes repeating the second path within the consolidated path the second repeat number of times.

The non-transitory computer-readable medium may include instructions to cause the computing device to receive a playlist number from the user through the user interface; and creating the consolidated path includes repeating the consolidated path the playlist number of times.

The non-transitory computer-readable medium may include instructions to cause the computing device to transmit the consolidated path to an autonomous vehicle.

DETAILED DESCRIPTION

An autonomous vehicle system that provides a playlist of potential paths for a user to select and implement so that an autonomous vehicle can follow the playlist of potential paths from one path to another path to another path is disclosed. The playlist may include one or more paths repeated any number of times. In addition, one cycle of a playlist may be repeated one or more times. The paths or combination of paths may be created, for example, by a user in an autonomous vehicle command and control system. The playlist of potential paths, once created, may be communicated to an autonomous vehicle for execution.

A playlist, for example, may be created for a single autonomous vehicle. As another example, a number of playlists may be created for a number of different autonomous vehicles such as, for example, with each different playlist using the same or different paths.

Figure 1:
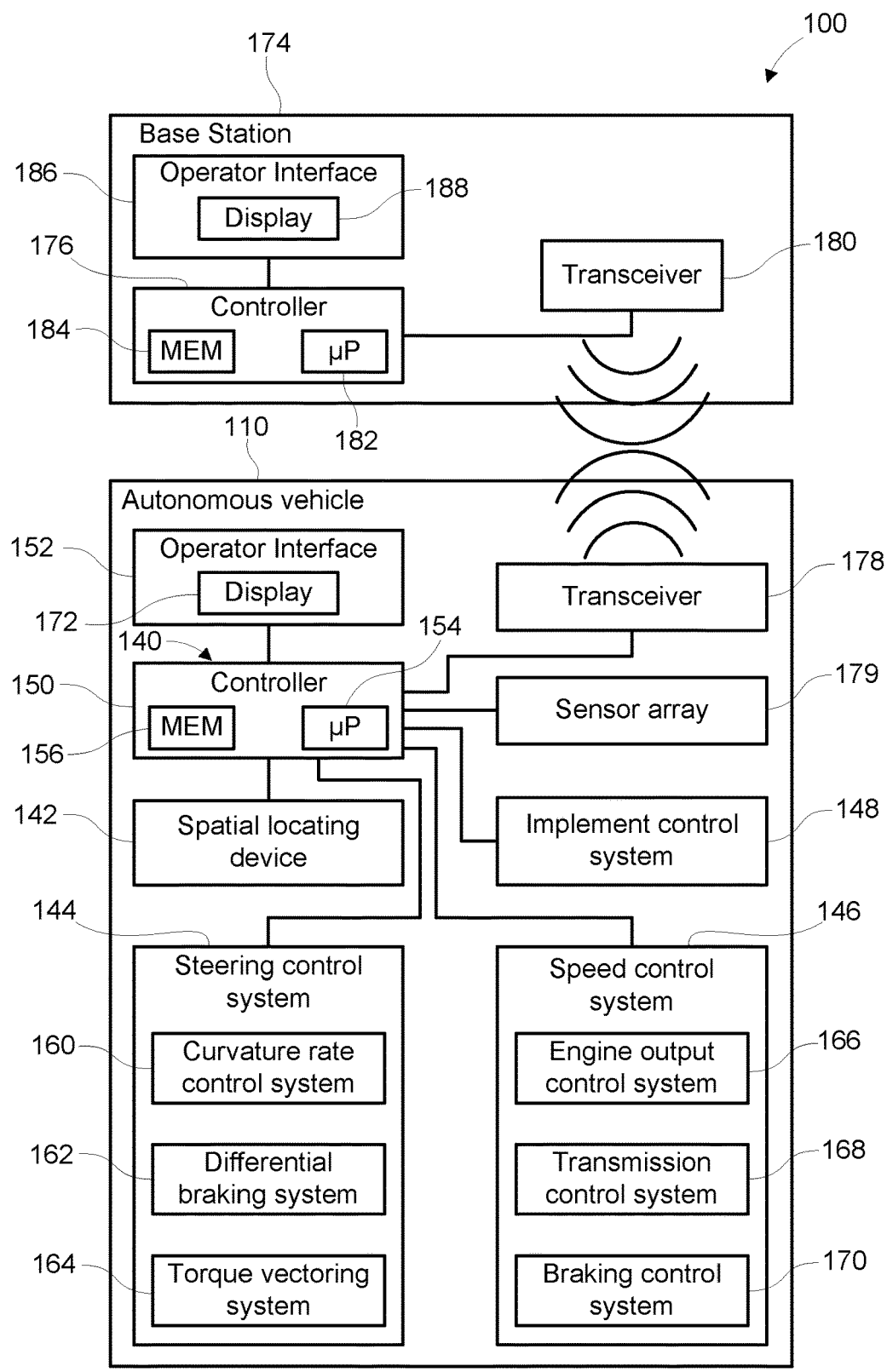
FIG. 1 is a block diagram of an example communication and control system.

FIG. 1 is a block diagram of a communication and control system 100. The communication and control system 100, for example, may include a vehicle control system 110 which may be mounted on an autonomous vehicle 110. The autonomous vehicle 110, for example, may include an automobile, a truck, a van, an electric vehicle, a combustion vehicle, a loader, wheel loader, a track loader, a dump truck, a digger, a backhoe, a forklift, etc. The communication and control system 100, for example, may include any or all components of computational system 500 shown in FIG. 5.

The autonomous vehicle 110, for example, may include a steering control system 144 that may control a direction of movement of the autonomous vehicle 110. The steering control system 144, for example, may include any or all components of computational system 500 shown in FIG. 5.

The autonomous vehicle 110, for example, may include a speed control system 146 that controls a speed of the autonomous vehicle 110. The autonomous vehicle 110, for example, may include an implement control system 148 that may control operation of an implement towed by the autonomous vehicle 110 or integrated within the autonomous vehicle 110. The implement control system 148, for example, may include any type of implement such as, for example, a bucket, a shovel, a blade, a thumb, a dump bed, a plow, an auger, a trencher, a scraper, a broom, a hammer, a grapple, forks, boom, spears, a cutter, a wrist, a tiller, a rake, etc. The speed control system 146, for example, may include any or all components of computational system 500 shown in FIG. 5.

The control system 140, for example, may include a controller 150 communicatively coupled to the steering control system 144, to the speed control system 146, and the implement control system 148. The control system 140, for example, may be integrated into a single control system. The control system 140, for example, may include a plurality of distinct control systems. The control system 140, for example, may include any or all the components show in FIG. 5.

The controller 150, for example, may receive signals relative to many parameters of interest including, but not limited to: vehicle position, vehicle speed, vehicle heading, desired path location, off-path normal error, desired off-path normal error, heading error, vehicle state vector information, curvature state vector information, turning radius limits, steering angle, steering angle limits, steering rate limits, curvature, curvature rate, rate of curvature limits, roll, pitch, rotational rates, acceleration, and the like, or any combination thereof.

The controller 150, for example, may be an electronic controller with electrical circuitry configured to process data from the various components of the autonomous vehicle 110. The controller 150 may include a processor, such as the processor 154, and a memory device 156. The controller 150 may also include one or more storage devices and/or other suitable components (not shown). The processor 154 may be used to execute software, such as software for calculating drivable path plans. Moreover, the processor 154 may include multiple microprocessors, one or more "general-purpose" microprocessors, one or more special-purpose microprocessors, and/or one or more application specific integrated circuits (ASICS), or any combination thereof. For example, the processor 154 may include one or more reduced instruction set (RISC) processors. The controller 150, for example, may include any or all the components show in FIG. 5.

The controller 150 may be in communication with a spatial locating device 142 such as, for example, a GPS device. The spatial locating device 142 may provide geolocation data to the controller 150.

The memory device 156, for example, may include a volatile memory, such as random access memory (RAM), and/or a nonvolatile memory, such as ROM. The memory device 156 may store a variety of information and may be used for various purposes. For example, the memory device 156 may store processor-executable instructions (e.g., firmware or software) for the processor 154 to execute, such as instructions for calculating drivable path plan, and/or controlling the autonomous vehicle 110. The memory device 156 may include flash memory, one or more hard drives, or any other suitable optical, magnetic, or solid-state storage medium, or a combination thereof. The memory device 156 may store data such as field maps, maps of desired paths, vehicle characteristics, software or firmware instructions and/or any other suitable data.

The steering control system 144, for example, may include a curvature rate control system 160, a differential braking system 162, a steering mechanism, and a torque vectoring system 164 that may be used to steer the autonomous vehicle 110. The curvature rate control system 160, for example, may control a direction of an autonomous vehicle 110 by controlling a steering control system of the autonomous vehicle 110 with a curvature rate, such as an Ackerman style autonomous loader, 110 or articulating loader. The curvature rate control system 160, for example, may automatically rotate one or more wheels or tracks of the autonomous vehicle 110 via hydraulic or electric actuators to steer the autonomous vehicle 110. By way of example, the curvature rate control system 160 may rotate front wheels/tracks, rear wheels/tracks, and/or intermediate wheels/tracks of the autonomous vehicle 110 or articulate the frame of the loader, either individually or in groups. The differential braking system 162 may independently vary the braking force on each lateral side of the autonomous vehicle 110 to direct the autonomous vehicle 110. Similarly, the torque vectoring system 164 may differentially apply torque from the engine to the wheels and/or tracks on each lateral side of the autonomous vehicle 110. While the steering control system 144 includes the curvature rate control system 160, the differential braking system 162, and/or the torque vectoring system 164. A steering control system 144, for example, may include other and/or additional systems to facilitate turning the autonomous vehicle 110 such as an articulated steering control system, a differential drive system, and the like.

The speed control system 146, for example, may include an engine output control system 166, a transmission control system 168, and a braking control system 170. The engine output control system 166 may vary the output of the engine to control the speed of the autonomous vehicle 110. For example, the engine output control system 166 may vary a throttle setting of the engine, a fuel/air mixture of the engine, a timing of the engine, and/or other suitable engine parameters to control engine output. In addition, the transmission control system 168 may adjust gear selection within a transmission to control the speed of the autonomous vehicle 110. Furthermore, the braking control system 170 may adjust braking force to control the speed of the autonomous vehicle 110. While the illustrated speed control system 146 includes the engine output control system 166, the transmission control system 168, and/or the braking control system 170. A speed control system 146, for example, having other and/or additional systems to facilitate adjusting the speed of the autonomous vehicle 110 may be included.

The implement control system 148, for example, may control various parameters of the implement towed by and/or integrated within the autonomous vehicle 110. For example, the implement control system 148 may instruct an implement controller via a communication link, such as a CAN bus, ISOBUS, Ethernet, wireless communications, and/or Broad R Reach type Automotive Ethernet, etc.

The implement control system 148, for example, may instruct an implement controller to adjust a penetration depth of at least one ground engaging tool of an agricultural implement, which may reduce the draft load on the autonomous vehicle 110.

The implement control system 148, as another example, may instruct the implement controller to transition an agricultural implement between a working position and a transport portion, to adjust a flow rate of product from the agricultural implement, to adjust a position of a header of the agricultural implement (e.g., a harvester, etc.), among other operations, etc.

The implement control system 148, as another example, may instruct the implement controller to adjust a shovel height, a shovel angle, a shovel position, etc.

The implement control system 148, as another example, may instruct the implement controller to adjust a shovel height, a shovel angle, a shovel position, etc.

The controller 150, for example, may be coupled with a sensor array 179. The sensor array 179, for example, may facilitate determination of condition(s) of the autonomous vehicle 110 and/or the work area. For example, the sensor array 179 may include one or more sensors (e.g., infrared sensors, ultrasonic sensors, magnetic sensors, radar sensors, Lidar sensors, terahertz sensors, sonar sensors, cameras, etc.) that monitor a rotation rate of a respective wheel or track and/or a ground speed of the autonomous vehicle 110. The sensors may also monitor operating levels (e.g., temperature, fuel level, etc.) of the autonomous vehicle 110. Furthermore, the sensors may monitor conditions in and around the work area, such as temperature, weather, wind speed, humidity, and other conditions. The sensors, for example, may detect physical objects in the work area, such as the parking stall, the material stall, accessories, other vehicles, other obstacles, or other object(s) that may in the area surrounding the autonomous vehicle 110. Further, the sensor array 179 may be utilized by the first obstacle avoidance system, the second obstacle avoidance system, or both.

The operator interface 152, for example, may be communicatively coupled to the controller 150 and configured to present data from the autonomous vehicle 110 via a display 172. Display data may include data associated with operation of the autonomous vehicle 110, data associated with operation of an implement, a position of the autonomous vehicle 110, a speed of the autonomous vehicle 110, a desired path, a drivable path plan, a target position, a current position, etc. The operator interface 152 may enable an operator to control certain functions of the autonomous vehicle 110 such as starting and stopping the autonomous vehicle 110, inputting a desired path, etc. The operator interface 152, for example, may enable the operator to input parameters that cause the controller 150 to adjust the drivable path plan. For example, the operator may provide an input requesting that the desired path be acquired as quickly as possible, that an off-path normal error be minimized, that a speed of the autonomous vehicle 110 remain within certain limits, that a lateral acceleration experienced by the autonomous vehicle 110 remain within certain limits, etc. In addition, the operator interface 152 (e.g., via the display 172, or via an audio system (not shown), etc.) may alert an operator if the desired path cannot be achieved, for example.

The control system 140, for example, may include a base station 174 having a base station controller 176 located remotely from the autonomous vehicle 110. For example, control functions of the control system 140 may be distributed between the controller 150 of the autonomous loader control system 140 and the base station controller 176. The base station controller 176, for example, may perform a substantial portion of the control functions of the control system 140. For example, a first transceiver 178 positioned on the autonomous vehicle 110 may output signals indicative of vehicle characteristics (e.g., position, speed, heading, curvature rate, curvature rate limits, maximum turning rate, minimum turning radius, steering angle, roll, pitch, rotational rates, acceleration, etc.) to a second transceiver 180 at the base station 174. The base station controller 176, for example, may calculate drivable path plans and/or output control signals to control the curvature rate control system 160, the speed control system 146, and/or the implement control system 148 to direct the autonomous vehicle 110 toward the desired path, for example. The base station controller 176 may include a processor 182 and memory device 184 having similar features and/or capabilities as the processor 154 and the memory device 156 discussed previously. Likewise, the base station 174 may include an operator interface 186 having a display 188, which may have similar features and/or capabilities as the operator interface 152 and the display 172 discussed previously.

Figure 2:
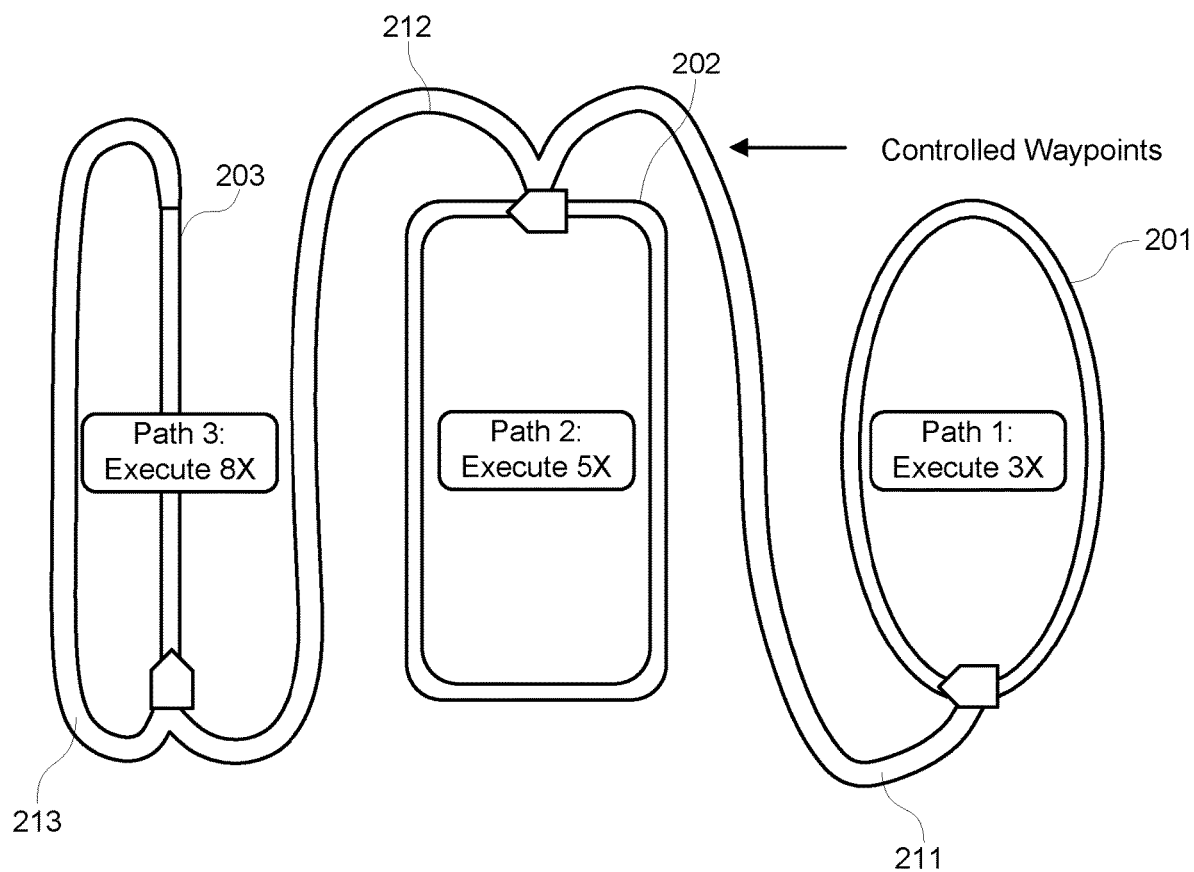
FIG. 2 is an illustration of three example paths for an autonomous vehicle.

FIG. 2 is an illustration of three example paths for an autonomous vehicle: path 201, path 202, and path 203. These paths may be created at the base station 174. The paths may be created or drawn within a digital map of a given geolocation area. Each path, for example, may include time, positions, heading, and/or velocity data.

A path, for example, may include any type of path such as, for example, curved paths, straight paths, city paths, paths with obstacles, paths with obstructions, paths with other automobiles, paths without other automobiles, paths with traffic lights, paths without traffic lights, paths with one or more traffic signs (e.g., speed limit, stop, yield, etc.). A path, for example, may include one or more of a loop, a straight-away, a figure eight, a square, a circle, an interchange, etc.

A path, for example, may be dynamic. For example, an obstacle in one of the paths may change after the autonomous vehicle has traversed the path. As another example, a turn or corner in one of the paths may change after the autonomous vehicle has traversed the path. As another example, a speed for the autonomous vehicle to follow may change after the autonomous vehicle has traversed the path.

A plurality of waypoints may be drawn on the map between paths. A waypoint may provide a path for an autonomous vehicle between one path and another path or the end of one path to the beginning of the path. For example, waypoint 211 may connect path 201 and path 202; waypoint 212 may connect path 202 and path 203; and/or waypoint 213 may connect the end of path 203 with the beginning of path 203. If followed by an autonomous vehicle, the waypoints 211, 212, 213 may allow the autonomous vehicle to proceed from one path to another or from the end of a path to the beginning of the path.

The paths 201, 202, 203 may be created in any manner by a user interacting, for example, with the base station 174. The waypoints, for example, may be created by a user or may be automatically created by software executing at the base station 174. The waypoints, for example, may be input or uploaded from a file.

For example, a listing of paths may be presented to a user via a user interface such as, for example, via the base station 174 or through a network interface. These paths may include all the previously presented paths. In the example, shown in FIG. 2, the listing of paths may include path 201, 202, 203. The user, for example, may two or more paths they wish the autonomous vehicle to follow and/or the number of times the autonomous vehicle should proceed along a given path. The selected paths may be considered a path playlist.

A consolidated path may be created that includes the first path selected by the user and/or the number of times the autonomous vehicle is requested to follow the first path, the waypoint between the first path and the second path, and the second path and/or the number of times the autonomous vehicle is requested to follow the first path. The consolidated path may also include a waypoint between the end of one path and the beginning of the next path. This consolidated path can then be sent to the autonomous vehicle.

For example, a listing of paths may be presented to a user via a user interface such as, for example, via the base station 174 or through a network interface. These paths may include all the previously presented paths. In the example, shown in FIG. 2, the listing of paths may include path 201, 202, 203. The user, for example, may select two or more paths they wish the autonomous vehicle to follow and/or the number of times the autonomous vehicle should proceed along a given path. The selected paths may be considered a path playlist.

The user, for example, may change the order of the paths within the playlist. The user, for example, may set the number of times the entire playlist is repeated.

The user, for example, may add a pause within the playlist such as, for example, for re-fueling, vehicle maintenance, site adjustments, track maintenance, track obstructions, weather conditions, personal conditions, etc. The pause, for example, can occur in real time or may be programmed in advance as another point along the path.

When the playlist has been paused, for example, the location of the autonomous vehicle may be saved. When the playlist is restarted the autonomous vehicle may be driven back to the stopped location. This may occur, for example, by the creating a waypoint from the autonomous vehicles current position to the stopped location.

A graphical user interface, for example, may provide the user with the functionality to visually see the listing of potential paths, create a playlist, order one or more of the potential paths within the playlist, set the number of times the autonomous vehicle repeats each path, sets the number of times the entire playlist is repeated, etc. During execution of the playlist, the graphical user interface, for example, may display a map showing the paths in the playlist and the progress of the autonomous vehicle as it follows the playlist.

Figure 3:
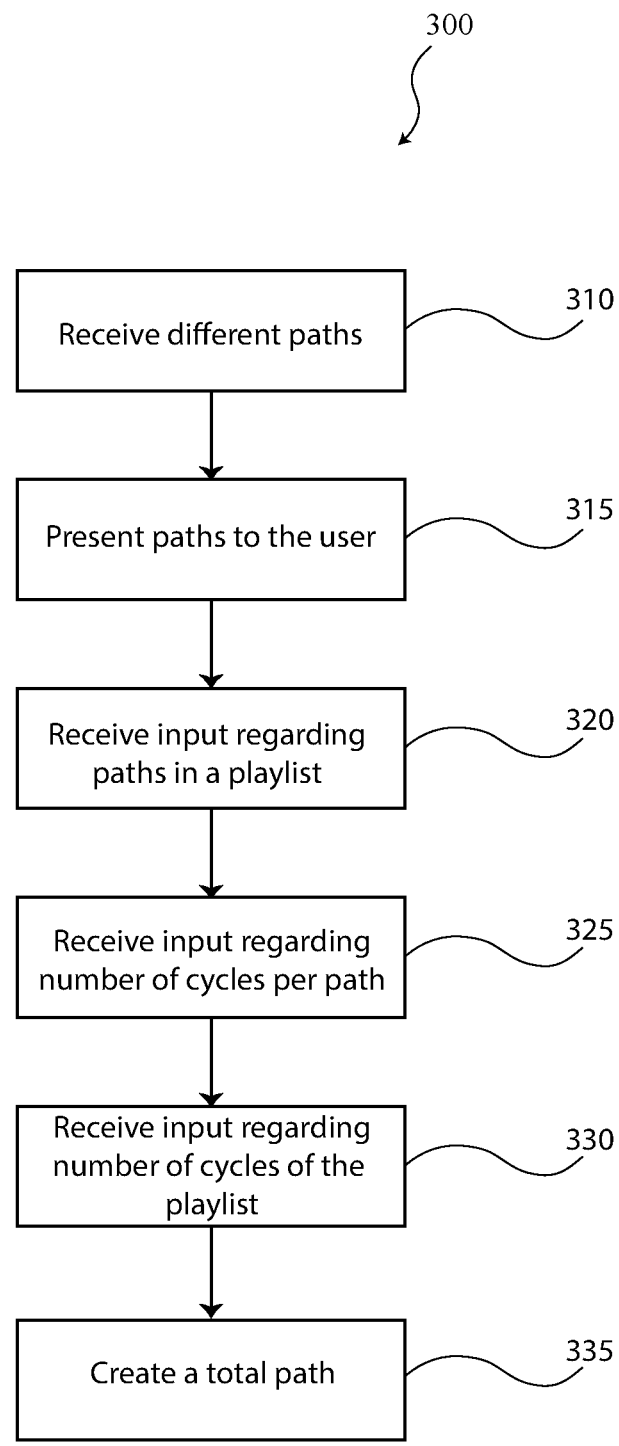
FIG. 3 is an example process for receiving input from a user to create a path from a playlist of potential paths.

FIG. 3 is an example process 300 for receiving input from a user to create a path from a playlist of potential paths for an autonomous vehicle. The process 300 may include additional blocks. Some block may be removed from the process 300 and/or some blocks may be skipped. Process 300, for example, may be executed at the base station 174. The process 300 begins at block 310. At block 310 the user (or a number of users) can create a plurality of paths. These paths, for example, may include any of the paths shown in FIG. 2 and/or described above. These paths, for example, may include any shape, length, and/or configuration. These paths, for example, may include various limitations such as, for example, time, positions, heading, and/or velocity, etc.

The paths, for example, may be created and imported. For example, paths may be defined in a CSV file and uploaded to a computer system or the cloud such as, for example, to the base station 174.

At block 315 the plurality of paths may be presented to the user such as, for example, via a user interface. The user may select one or more of the paths via the user interface.

At block 320 a user input of one or more paths may be received from the user via the user interface.

At block 325 a user input indicating the number of cycles of each path of the plurality of paths may be received from the user via the user interface.

At block 330 a user input indicating the number of cycles of the playlist may be received from the user via the user interface.

At block 335 a consolidated path can be created that includes each selected path repeated each of the number of cycles of each path and waypoints between respective paths (or the end of a path and the beginning of the same path) and repeated the number of cycles of the playlist.

The consolidated path may be sent to an autonomous vehicle. The autonomous vehicle, for example, may execute the consolidated path. A user input may pause the execution of the consolidated path and/or restart the execution of the playlist.

Figure 4:
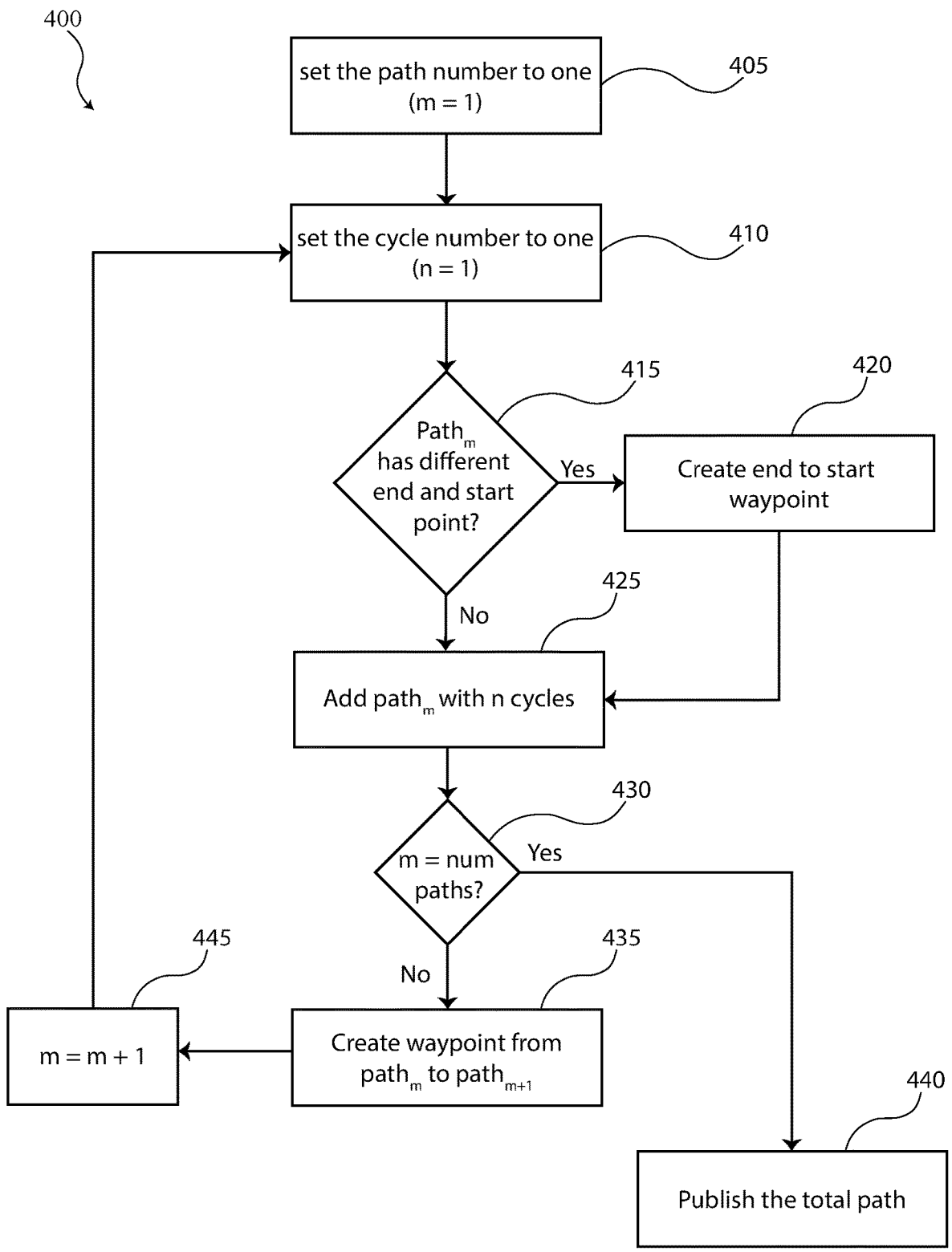
FIG. 4 is an example process for creating a consolidated path.

FIG. 4 is an example process 400 for creating a consolidated path for an autonomous vehicle. Process 400 may include additional blocks. Some block may be removed from process 400 and/or some blocks may be skipped. Process 400, for example, may be executed at the base station 174. Process 400 begins at block 405.

At block 405 the path number may be initiated and/or set to one (m=1). At block 410 the cycle number may be initiated and/or set to one (n=1).

At block 415 the process can determine whether the $m_{th}$ path, $path_m$, has a different end point and start point such as, for example, path 203 and/or the path number, m, is greater than one. If the $m_{th}$ path has a different end point and start point, then process 400 proceeds to block 420. Otherwise, process 400 proceeds to block 425.

At block 420 a waypoint from the end of the path to the start of the path may be created such as, for example, waypoint 213.

At block 425 the $m_{th}$ path is added to the consolidated path and, if needed, the end to beginning waypoint is included. The $m_{th}$ path may be added to the consolidated path with n cycles. For example, path 201 may be added to the consolidated path three times. As another example, path 203 may be added to the consolidated path with waypoint 213 8 times.

At block 430 the process 400 may determine whether the number of paths selected by the user m has been reached. If so, the process 400 proceeds to block 440. If the number of paths selected by the user m has not been reached, then process 400 proceeds to block 435.

At block 435, a waypoint from the $m_{th}$ path to the $(m+1)_{th}$ path may be created or retrieved from memory etc. For example, waypoint 211 from path 201 to path 202 may be created or retrieved. As another example, waypoint 212 from path 202 to path 203 may be created or retrieved. This waypoint may be added to the consolidated path at the end of the $m_{th}$ path.

At block 445 the path number m may be incremented, and the process 400 continues for the next path.

Figure 5:
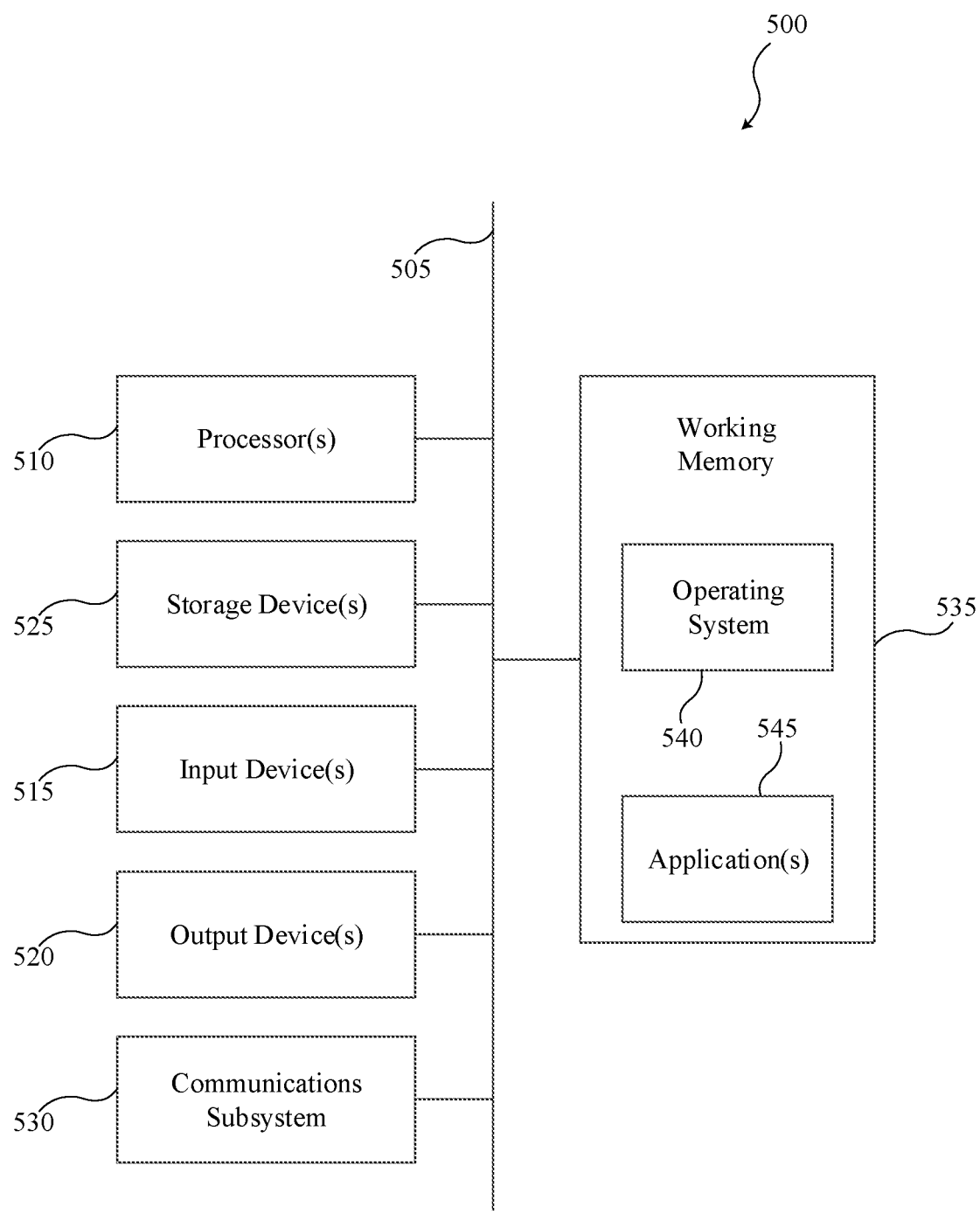
FIG. 5 is a block diagram of a computational system that can be used to with or to perform some embodiments described in this document.

The computational system 500, shown in FIG. 5 can be used to perform any of the embodiments of the invention. For example, computational system 500 can be used to execute process 300 and/or process 400. As another example, computational system 500 can perform any calculation, identification and/or determination described here. Computational system 500 includes hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computational system 500 may further include (and/or be in communication with) one or more storage devices 525, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 500 might also include a communications subsystem 530, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 530 may permit data to be exchanged with a network (such as the network described below, to name one example), and/or any other devices described in this document. In many embodiments, the computational system 500 will further include a working memory 535, which can include a RAM or ROM device, as described above.

The computational system 500 also can include software elements, shown as being currently located within the working memory 535, including an operating system 540 and/or other code, such as one or more application programs 545, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 525 described above.

In some cases, the storage medium might be incorporated within the computational system 500 or in communication with the computational system 500. In other embodiments, the storage medium might be separate from a computational system 500 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 500 and/or might take the form of source and/or installable code, which, upon compilation and/or installation on the computational system 500 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

The terms "first", "second", "third", etc. are used to distinguish respective elements and are not used to denote a particular order of those elements unless otherwise specified or order is explicitly described or required.

Numerous specific details are set forth to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained in software to be used in programming or configuring a computing device.

Embodiments of the methods disclosed may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   providing a listing of potential paths to a user through a user interface, each potential path of the list of potential paths representing an actual path a vehicle may be required to follow, wherein each path in the listing of potential paths is a path for an autonomous vehicle to navigate;
   receiving a selection of a first path from a user through the user interface;
   receiving a selection of a second path from the user through the user interface;
   receiving a first repeat number from the user through the user interface;
   receiving a second repeat number from the user through the user interface;
   receiving a playlist number from the user through the user interface;
   creating a consolidated path for an autonomous vehicle to follow that includes the first path and the second path, wherein creating the consolidated path includes:
      creating a waypoint between the first path and the second path;
      repeating the first path within the consolidated path the first repeat number of times;
      repeating the second path within the consolidated path the second repeat number of times; and
      repeating the consolidated path the playlist number of times; and
   controlling an autonomous vehicle along the consolidated path.

2. An autonomous vehicle command and control system comprising:
   a user interface;
   a digital storage;
   a communication interface; and
   a controller communicatively coupled with the user interface, the communication interface, and the digital storage, wherein the controller
      provides a listing of potential paths stored in the digital storage to a user through the user interface;
      receives a selection of a first path from a user through the user interface;
      receives a selection of a second path from the user through the user interface;
      receives a first repeat number from the user through the user interface;
      receives a second repeat number from the user through the user interface;
      receives a playlist number from the user through the user interface;
      creates a consolidated path that includes the first path and the second path, wherein creating the consolidated path includes:
         creating a waypoint between the first path and the second path;
         repeating the first path within the consolidated path the first repeat number of times;
         repeating the second path within the consolidated path the second repeat number of times; and
         repeating the consolidated path the playlist number of times; and
      controls the autonomous vehicle along the consolidated path.

3. A non-transitory computer-readable medium storing instructions that, when executed by a computing device, cause the computing device to:
   provide a listing of potential paths to a user through a user interface;
   receive a selection of a first path from a user through the user interface;
   receive a selection of a second path from the user through the user interface;
   receive a first repeat number from the user through the user interface;
   receive a second repeat number from the user through the user interface;
   receive a playlist number from the user through the user interface;
   create a consolidated path that includes the first path and the second path; wherein creating the consolidated path includes:
      creating a waypoint between the first path and the second path;
      repeating the first path within the consolidated path the first repeat number of times;
      repeating the second path within the consolidated path the second repeat number of times; and
      repeating the consolidated path the playlist number of times; and
   control an autonomous vehicle along the consolidated path.

* * * * *